(12) United States Patent
Jung et al.

(10) Patent No.: US 10,504,487 B2
(45) Date of Patent: Dec. 10, 2019

(54) AMBIENT AND CONTENT ADAPTIVE PIXEL MANIPULATION

(71) Applicant: Apple Inc., Cupertino, CA (US)

(72) Inventors: Tobias Jung, San Francisco, CA (US); Marc Albrecht, San Francisco, CA (US); Sean C. Chang, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 272 days.

(21) Appl. No.: 15/783,831

(22) Filed: Oct. 13, 2017

(65) Prior Publication Data

US 2018/0108327 A1 Apr. 19, 2018

Related U.S. Application Data

(60) Provisional application No. 62/408,646, filed on Oct. 14, 2016, provisional application No. 62/408,648, filed on Oct. 14, 2016.

(51) Int. Cl.
*G06T 5/40* (2006.01)
*G09G 5/10* (2006.01)

(52) U.S. Cl.
CPC ............... *G09G 5/10* (2013.01); *G06T 5/40* (2013.01); *G06T 2207/10016* (2013.01); *G06T 2207/20192* (2013.01); *G09G 2320/0276* (2013.01); *G09G 2320/066* (2013.01); *G09G 2320/0626* (2013.01); *G09G 2360/144* (2013.01)

(58) Field of Classification Search
CPC combination set(s) only.
See application file for complete search history.

(56) References Cited

U.S. PATENT DOCUMENTS

| | | | |
|---|---|---|---|
| 5,581,370 A | 12/1996 | Fuss | |
| 7,426,312 B2 | 9/2008 | Dance | |
| 8,248,492 B2 * | 8/2012 | Mitsunaga | G06T 5/40 348/252 |
| 8,314,847 B2 * | 11/2012 | Brunner | G06T 5/009 348/222.1 |
| 8,577,142 B2 * | 11/2013 | Otsuki | G06T 5/008 382/172 |
| 9,418,311 B2 | 8/2016 | Bai | |
| 9,454,810 B2 | 9/2016 | Valdes Lopez | |
| 10,129,511 B2 * | 11/2018 | Nose | H04N 5/23229 |
| 2007/0237392 A1 * | 10/2007 | Ohara | H04N 1/4074 382/171 |

(Continued)

*Primary Examiner* — Anand P Bhatnagar
(74) *Attorney, Agent, or Firm* — Blank Rome LLP

(57) ABSTRACT

Systems, methods, and computer readable media to improve the operation of display systems are described herein. In general, techniques are disclosed for ambient and content adaptive local tone mapping operations that improve display readability under bright ambient light conditions. More particularly, techniques disclosed herein improve contrast and brightness of dark image content while preserving bright areas. The disclosed architecture and operational methodologies generate high contrast images (e.g., amplifying dark regions while preserving bright content), preserve uniform backgrounds (e.g., static background pixels), are stabile in the face of local and global histogram changes (e.g., background not affected by small moving objects such as a mouse pointer), and provide near seamless fade-in and fad-out transitions.

24 Claims, 13 Drawing Sheets

(56) References Cited

U.S. PATENT DOCUMENTS

| | | | | |
|---|---|---|---|---|
| 2008/0030814 | A1* | 2/2008 | Ohara | H04N 1/4074 358/522 |
| 2010/0157078 | A1* | 6/2010 | Atanassov | G06T 5/007 348/222.1 |
| 2010/0278423 | A1* | 11/2010 | Itoh | G06T 5/008 382/169 |
| 2011/0116713 | A1* | 5/2011 | Zeng | G06T 5/008 382/167 |
| 2011/0194766 | A1* | 8/2011 | Otsuki | G06T 5/008 382/168 |
| 2012/0081385 | A1* | 4/2012 | Cote | H04N 5/23219 345/589 |
| 2013/0321700 | A1* | 12/2013 | Cote | G06T 7/90 348/453 |
| 2013/0329093 | A1* | 12/2013 | Zhang | H04N 5/2355 348/241 |
| 2013/0329098 | A1* | 12/2013 | Lim | H04N 9/64 348/246 |
| 2014/0267822 | A1* | 9/2014 | Roffet | H04N 5/225 348/222.1 |
| 2015/0348246 | A1* | 12/2015 | Lim | G06T 5/001 382/167 |
| 2018/0096467 | A1* | 4/2018 | Chesnokov | G06T 5/009 |

\* cited by examiner

AMBIENT AND CONTENT ADAPTIVE PIXEL MANIPULATION

BACKGROUND

This disclosure relates generally to display systems. More particularly, but not by way of limitation, this disclosure relates to techniques for modifying digital images so that they display more clearly in bright ambient environments. Many modern computer systems use active display technology (e.g., LED LCD technology). One inherent drawback to this type of display is that it is difficult to use in bright environments.

DETAILED DESCRIPTION

Figure 1:
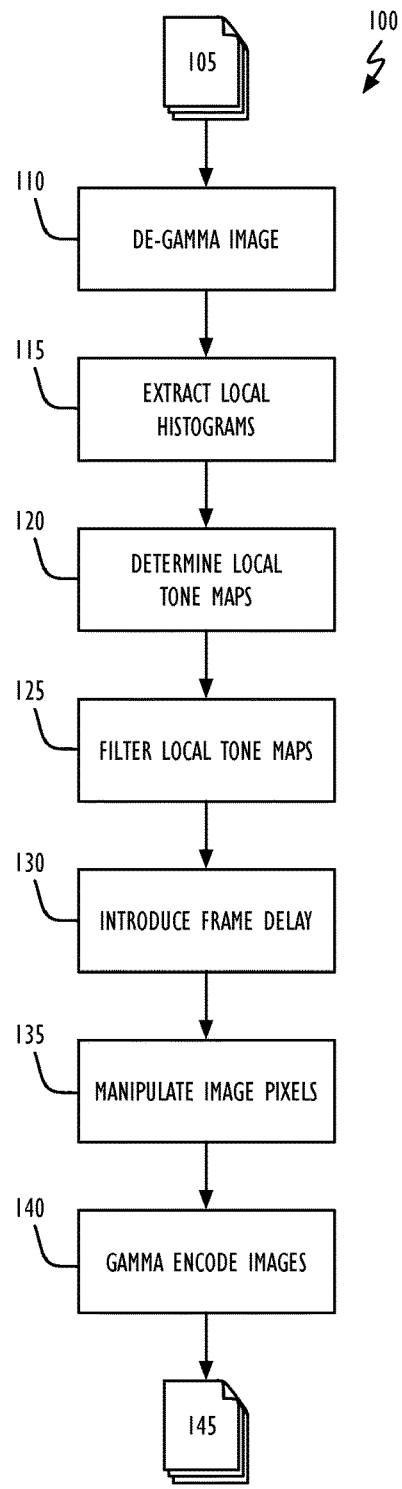
FIG. 1 shows, in flowchart form, a display operation in accordance with one embodiment.

This disclosure pertains to systems, methods, and computer readable media to improve the operation of display systems. In general, techniques are disclosed for ambient and content adaptive local tone mapping operations that improve display readability under bright ambient light conditions. More particularly, techniques disclosed herein improve contrast and brightness of dark image content while preserving bright areas. The disclosed architecture and operational methodologies generate high contrast images (e.g., amplifying dark regions while preserving bright content), preserve uniform backgrounds (e.g., static background pixels), are stabile in the face of local and global histogram changes (e.g., background not affected by small moving objects such as a mouse pointer), and provide near seamless fade-in and fad-out transitions.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood however that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

Embodiments of the display techniques set forth herein can assist with improving the functionality of computing devices or systems that generate images in a bright ambient environment. Computer functionality can be improved by enabling such computing devices or systems to generate images more easily viewable in bright ambient environments instead of using conventional display techniques that are not as easily viewable. Use of the disclosed techniques can assist with reducing wasted computational resources. For example, power consumption during display operations may be reduced. Computer functionality can also be improved by enabling the display of clear images despite a bright ambient environment.

It will be appreciated that in the development of any actual implementation (as in any software and/or hardware development project), numerous decisions must be made to achieve a developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of graphics processing systems having the benefit of this disclosure.

Referring to FIG. 1, display operation 100 in accordance with one or more embodiments may begin by receiving image sequence 105. Image sequence 105 may, for example, comprise a temporal sequence of video frames/images or a series of still images (e.g., such as captured during burst capture procedures). Each image may then have a de-gamma operation applied to it so as to convert the image to a linear luminance (Y) space (block 110). In one embodiment, each image pixel after the de-gamma operation may be 8 bits. In another embodiment, each such pixel may be 16 bits or 32 bits; the precise number of bits having no bearing on the disclosed techniques. The image may then be partitioned into regions and a local histogram for each region extracted or determined (block 115). By way of example, each image may be partitioned into 20 regions (e.g., 5×4), 32 regions (e.g., 8×4), 54 regions (e.g., 9×6), or 1024 regions (e.g., 32×32). Histograms based on each region's pixel values may then be determined. In one embodiment, each histogram may have a bin for each possible pixel value. For example, if each pixel value is represented by 8 bits, then each region's histogram may include 256 bins. In another embodiment, each histogram may have fewer bins than the number of possible pixel values. For example, if each pixel value may be represented by 16 bits, each region's histogram may include 16, 32 or 64 bins. In practice, the number of values each pixel may assume is larger than the number of bins in a histogram. The histograms so determined may be normalized and then used to find local tone curves for each region (block 120). A function of the local tone cures is to boost a region's local contrast for low grays while preserving contrast for high grays. The resulting local tone maps may be represented or organized as look-up tables (LUTs) and filtered to smooth each map's contour (block 125). In one embodiment, each local tone map (LTM) may have applied thereto a spatio-temporal filter. One example of such a filter is a low-pass filter (e.g., a bilateral or Gaussian filter). In one or more embodiments, the Gaussian filter may have a kernel whose size is a function of the number of regions into which the image has been partitioned. In general, the Gaussian kernel is small such as, for example, 3×3. Another illustrative spatio-temporal filter could be an infinite impulse response (IIR) filter. Next, a delay may be introduced to permit LUT generation (block 130). Restricting this delay to a single frame eliminates the need for a frame-buffer to store intermediate results. In another embodiment, a multi-frame delay may be introduced. While additional memory may be needed to store the incoming image sequence in these embodiments, the delay permits a more accurate transient response from frame-to-frame. Input image pixels may be manipulated in accordance with one or more of the generated LTMs (block 135), where after the resulting images may be gamma encoded (block 140) to generate final output images 145 that may be displayed.

Figure 2:
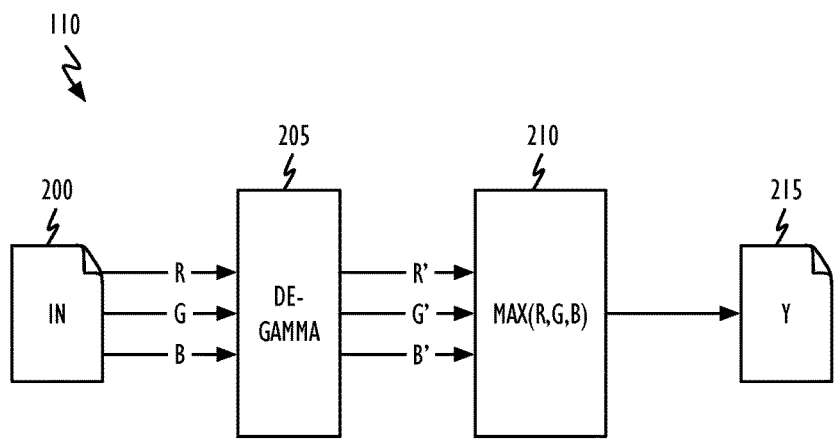
FIG. 2 shows, in block diagram form, a de-gamma operation in accordance with one embodiment.

Referring to FIG. 2, in some embodiments de-gamma operation 110 may incorporate additional actions. By way of example, in some embodiments de-gamma operation 110 may take input image 200 (whose pixels may have R, G and B values) and de-gamma each channel to produce an image having R', G' and B' values (block 205). A maximum operation may then be applied to the R', G' and B' values to produce luminance image 215 (block 210). As used here, the max(R, G, B) function 210 returns, for each pixel, a single value equal to the largest of the R, G and B input values. Luminance image 215 may then be further processed in accordance with block 115. If the image is encoded in a YCbCr type of format, the luminance channel may be used. In addition, for other formats a function of the different channels may be used.

Figure 3:
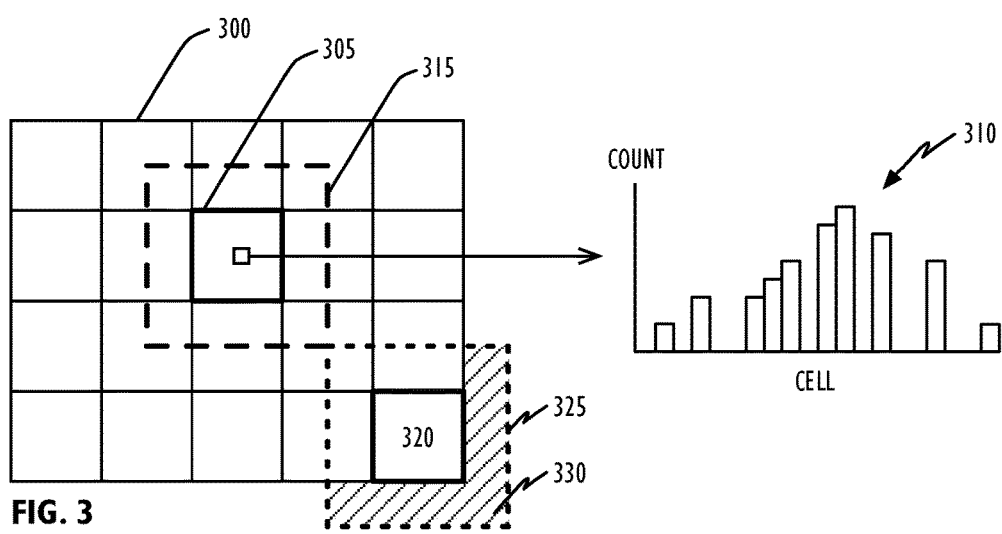
FIG. 3 shows a histogram generation technique in accordance with one embodiment.

Referring to FIG. 3, operations in accordance with block 115 may be applied, for example, to input image 300 that is partitioned into 20 regions. By way of example, image 215 could be used as input image 300. In one embodiment, only pixel values within each region (e.g., region 305) may be used to generate that region's histogram 310. In other embodiments, histogram 310 for region 305 (i.e., any region within frame 300) may be based on pixels both within region 305 and parts or portions of other regions surrounding region 305; denoted by 315. In some embodiments, extended histogram area 315 may extend half-way into each region surrounding target region 305. In other embodiments, extended histogram area 315 may extend more or less than half-way into each surrounding region. While the exact amount of overlap may be determined empirically for each application, in general if extended histogram area 315 overlaps too deeply into surrounding regions, histogram 310 will no longer represent a "local" histogram. On the other hand, if extended histogram area 315 does not overlap enough into surrounding regions, the final images (e.g., 145) may exhibit edge effects from one cell/region to another. It can be noted that for some regions such as edge region 320, extended histogram area 325 may extend off the image (denoted as area 330). A number of approaches may be adopted to accommodate such situations. For example, any portions of an extended histogram area extending off image 300 such as area 330 may be ignored—e.g., not accounted for in the region's corresponding histogram. Alternatively, pixels within frame 300 may be "mirrored" or "reflected" to the extent needed to "fill-up" area 330. While regions 305 and 320 have been shown as rectangular in shape, this is not necessary. Regions within frame or image 300 may be any shape desired to accommodate a particular application. In addition, extended histogram areas 315 and 325 may be the same shape as the region from which they extend or different.

Figure 4:
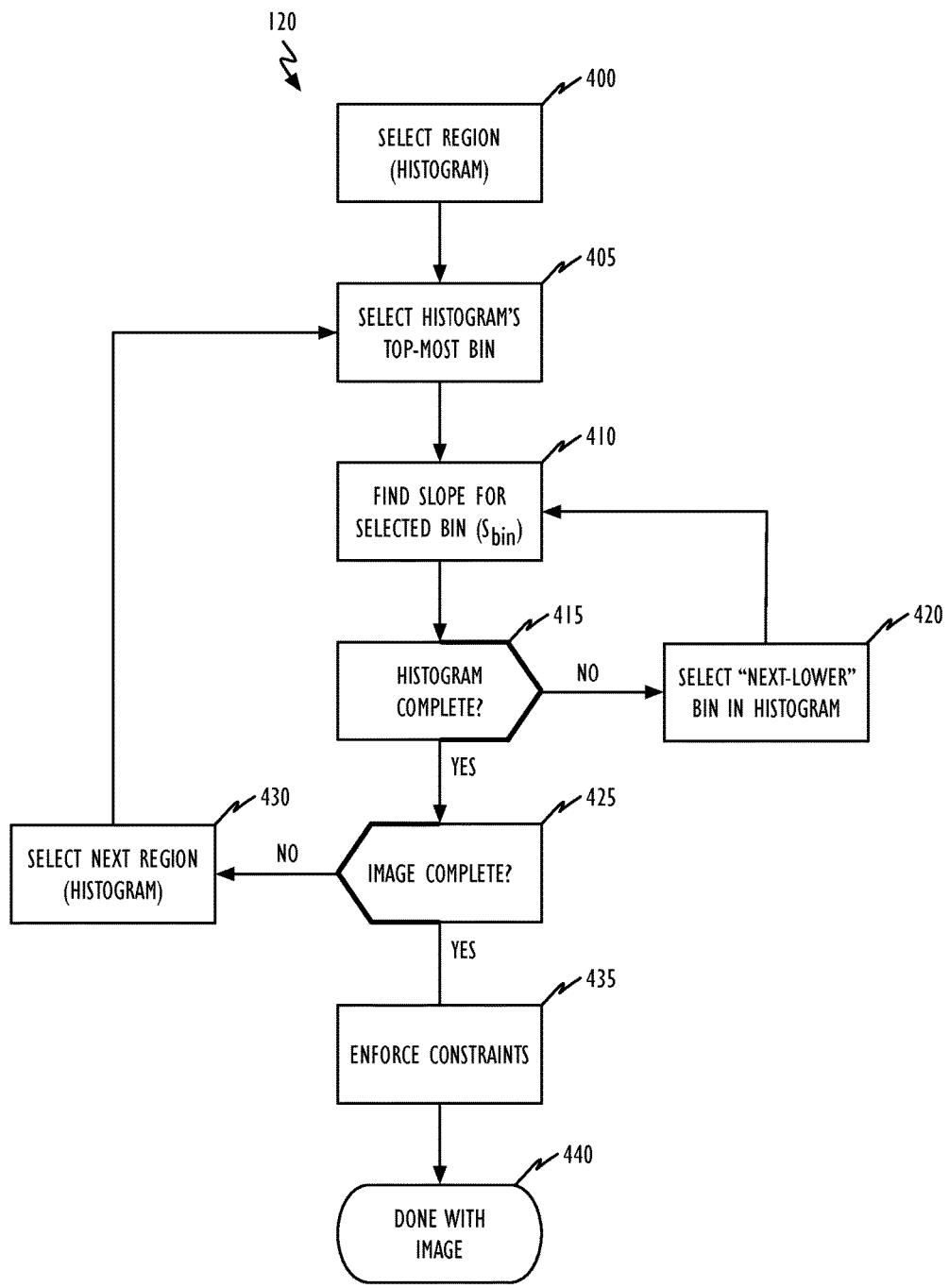
FIG. 4 shows, in flowchart form, a local tone map generation operation in accordance with one embodiment.

Referring to FIG. 4, local tone map (LTM) generation operation 120 in accordance with one or more embodiments may begin, for a given image, with selection of a first region and corresponding histogram from the image (block 400). The selected ("current") histogram's top-most bin may then be selected (block 405). As used here, the term "top-most" means that bin corresponding to the brightest pixels in the underlying region. For example, if the underlying region's luminance pixels are represented by 8 bits (permitting 256 brightness levels: 0 to 255) and there are 32 bins, the top-most bin would include a value indicating the number of pixels in the corresponding region having brightness values between 248 to 255 inclusive. A histogram's corresponding local tone map (LTM) may be determined by defining a slope s for each bin (block 410). A LTM's slope for a given bin may, in accordance with this disclosure, be expressed as:

$$s_{bin} = f(p_{bin}, s_{bin}^{min}, s_{bin}^{max}, s_g^{min}, s_g^{max}, p_{processed}), \qquad \text{EQ. 1}$$

where $f(\ )$ represents an arbitrary functional relationship, $T_{bin}$ represents the number of pixels in the bin (i.e., the number of pixels having a luminance value within the range specified by the bin), $s_{bin}^{min}$ represents the bin's minimum allowable slope, $s_{bin}^{max}$ represents the bin's maximum allowable slope, $s_g^{min}$ represents a global minimum slope, $s_g^{max}$ represents a global maximum slope, and $p_{processed}$ represents the number of pixels already processed in the current histogram. Values for $s_{bin}^{min}$ and $s_{bin}^{max}$ may be determined empirically by visual performance analysis; $s_{bin}^{min}$ and $s_{bin}^{max}$ may act as tuning parameters that may be adjusted to give an optimal performance for a given set of operating constraints. It has been found empirically that $s_{bin}^{min}$ and $s_{bin}^{max}$ may, for a given implementation, be global constant values (see below). In other embodiments, $s_{bin}^{min}$ and $s_{bin}^{max}$ may be a function of one or more prior bin's value. In general, $s_{bin}^{min}$ and $s_{bin}^{max}$ may be chosen so that the resulting image sequence does not exhibit flicker. That is, $s_{bin}^{min}$ and $s_{bin}^{max}$ may be chosen so that the local contrast is preserved or amplified without introducing anomalies in the final tone mapping curve. This function can be derived empirically or by statistical analysis of the local contrast parameters. Values for $s_g^{min}$ and $s_g^{max}$ may depend upon the captured scene's overall brightness as determined by an ambient light sensor (see below). In one embodiment, the brighter the captured scene, the larger the value of $s_g^{min}$ and $s_g^{max}$. As a result, the precise value of these parameters depend upon the scene and the type and functioning of the light sensor.

In one particular embodiment, $$s_{bin} = \max(p_{bin}^{\beta} \times s_{bin}^{max}, s_{bin}^{min}),$$  EQ. 2 with $$p_{processed} = p_{processed}(bin-1) + p_{bin} \text{ and}$$  EQ. 2A $$s_{bin}^{min} = \min\left(1.0, \left(\frac{p_{bin}}{p_{bin,reference}}\right)\right).$$  EQ. 2B Here, max( ) represents a maximum function that returns the larger of its two arguments, $\beta \in [0 \ldots 1]$ represents a contrast adjustment tuning parameter, and $p_{bin,reference}$ represents a predefined value that can be different for each of the histogram bins and is determined empirically. In practice, $p_{bin,reference}$ May be thought of as a vector, whose length is based on the number of histogram bins, that allows different gray level regions to be weighted differently so as to adjust for user preferences.

Returning to FIG. 4, once a bin's slope is determined in accordance with block 410 (e.g., EQS. 1 or 2), a check may be made to determine if all bins in the current histogram (region) have been accounted for (block 415). If additional bins remain to be processed (the "NO" prong of block 415), the next lower bin in the current histogram may be selected (block 420) where after operation 120 in accordance with the illustrative embodiment continues at block 410. If the current histogram has been completely processed (the "YES" prong of block 415), a check may be made to determine if every region within the current image has been accounted for (block 425). If at least one region remains (the "NO" prong of block 425), the next region may be selected (block 430) where after operation 120 in accordance with the illustrative embodiment continues at block 405. When all regions in the current image have been processed (the "YES" prong of block 425), global slope constraints $s_g^{min}$ and $s_g^{max}$ for each LTM bin may be enforced (block 435), where after operation 120 for the current image is complete (block 440).

Figure 5A:
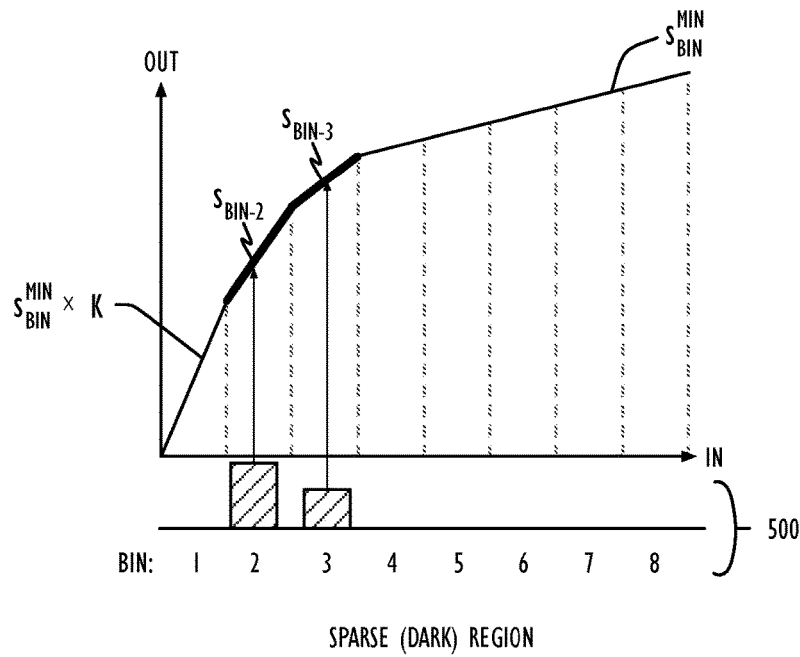
FIGS. 5A-5C illustrate a local tone map generation operation for a sparse dark image region in accordance with one embodiment.
Figure 5B:
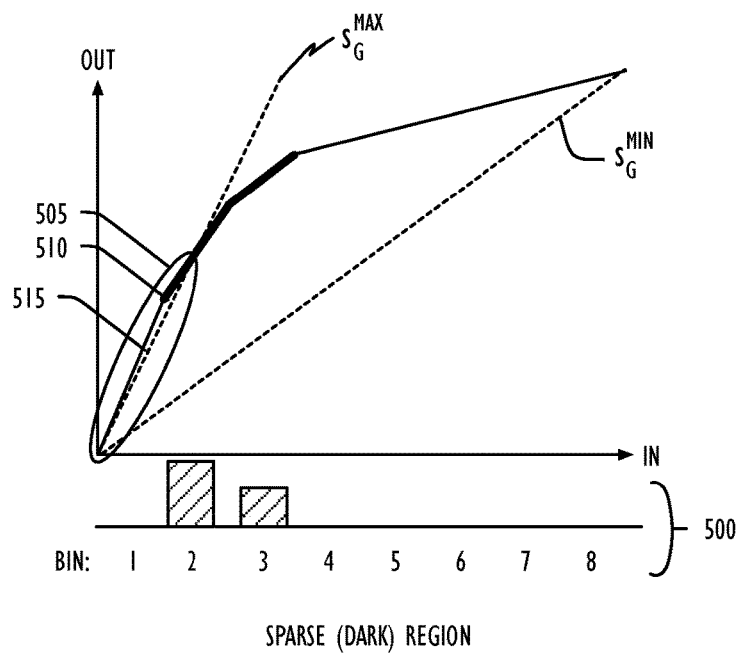
Figure 5C:
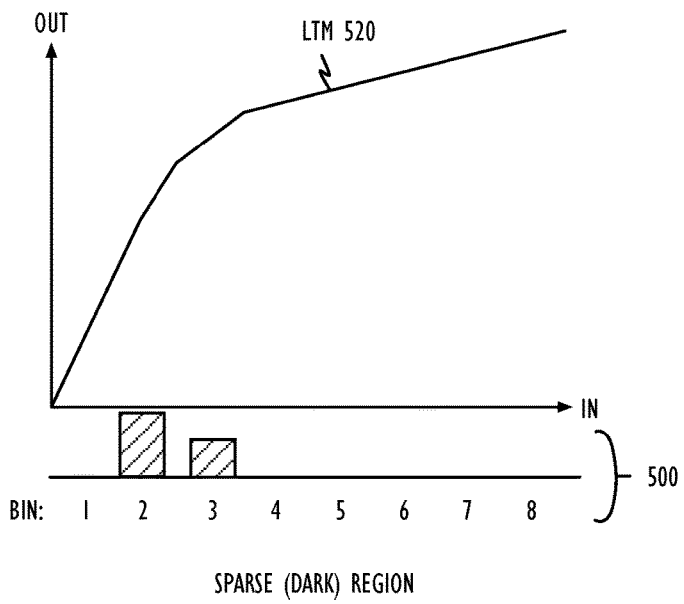

By way of example, LTM generation for a region having a sparse (dark) histogram in accordance with EQ. 2 is illustrated in FIG. 5. FIG. 5A shows how each bin's slope may vary in accordance with EQ. 2 as histogram 500 is processed. Starting at the highest (brightest) bin (bin 8), it can be seen that in accordance with EQ. 2 the slope remains at $s_{bin}^{min}$ until bin 3 is reached (the first non-zero bin). Bins 3 and 2 yield different slope values based on particular values of $p_{bin}$, $\beta$ and $p_{processed}$. As noted above, $\beta$ represents a contrast tuning parameter and may be selected from the range $[0 \ldots 1]$. Histogram cell 1 again has no value (i.e., is equal to '0') and so its corresponding slope is equal to some factor K (based on the number of pixels in the region covered by histogram 500) times $s_{bin}^{min}$. Referring to FIG. 5B, slope constraints $s_g^{min}$ and $s_g^{max}$ have been shown. In region 505 it may be seen that global max slope $s_g^{max}$ is less than bin 1's slope 510 and further undercuts the line segment corresponding to bin 2's slope 515. Referring to FIG. 5C, as a consequence of $s_g^{max}$'s limiting effect, LTM 520 has a contour that is restricted to $s_g^{max}$ at its lower (darker) end.

Figure 6A:
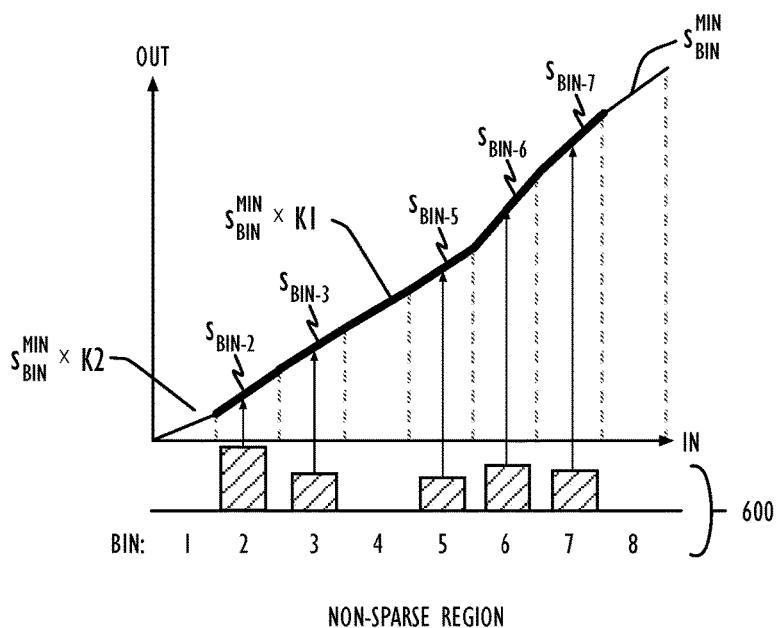
FIGS. 6A-6C illustrate a local tone map generation operation for a non-sparse image region in accordance with one embodiment.
Figure 6B:
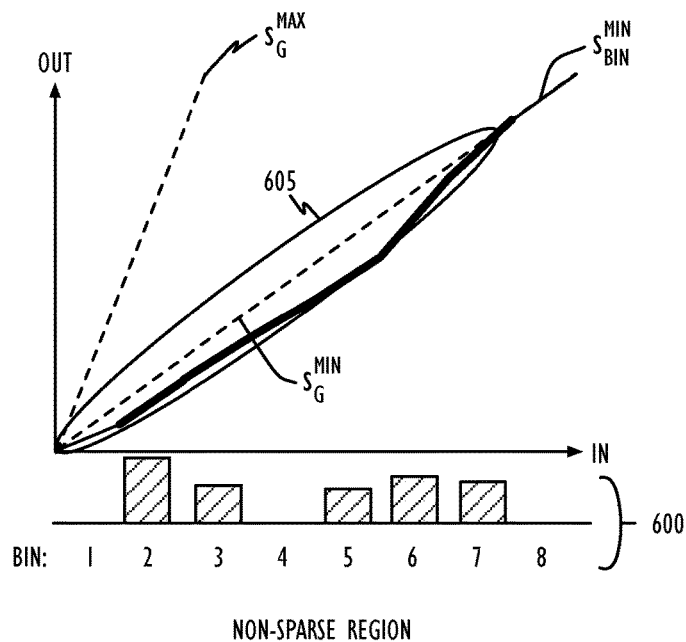
Figure 6C:
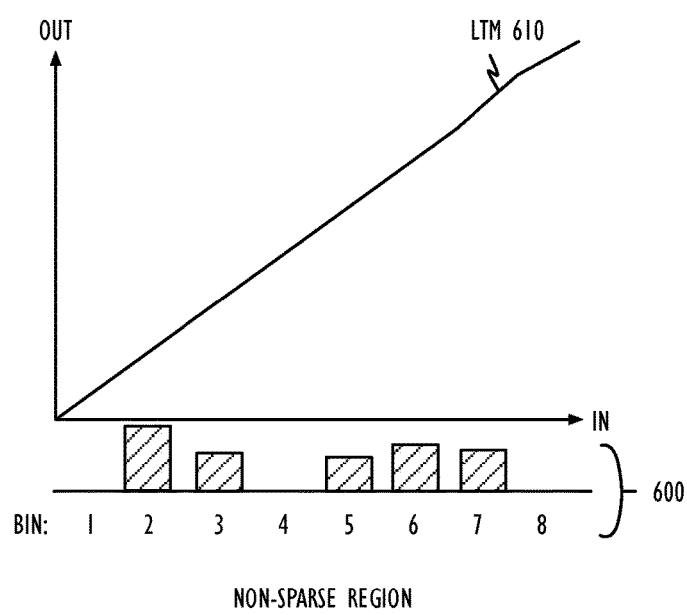

By way of another example, LTM Generation for a region having a non-sparse histogram in accordance with EQ. 2 is illustrated in FIG. 6. FIG. 6A shows how each bin's slope may vary in accordance with EQ. 2 as histogram 600 is processed. Again starting at the highest (brightest) bin (bin 8), it can be seen that in accordance with EQ. 2 the slope remains at $s_{bin}^{min}$ until bin 7 is reached; the first bin having a non-zero value. Bins 7, 6, 5, 3 and 2 yield different slopes depending on particular values for $p_{bin}$, $\beta$ and $p_{processed}$. Histogram bins 4 and 1 have no value (i.e., are equal to '0') and so their corresponding slope is equal to some factor K1 or K2 (based on the number of pixels in the region covered by histogram 600) times $s_{bin}^{min}$. Referring to FIG. 6B, slope constraints $s_g^{min}$ and $s_g^{max}$ have been shown. In region 605 it may be seen that global min slope $s_g^{min}$ is greater than the slope of any of bins 1-7. Referring to FIG. 6C, as a consequence of $s_g^{min}$'s limiting effect, LTM 610 has a contour that is restricted to $s_g^{min}$ along its length (except in areas corresponding to bin 8).

Figure 7:
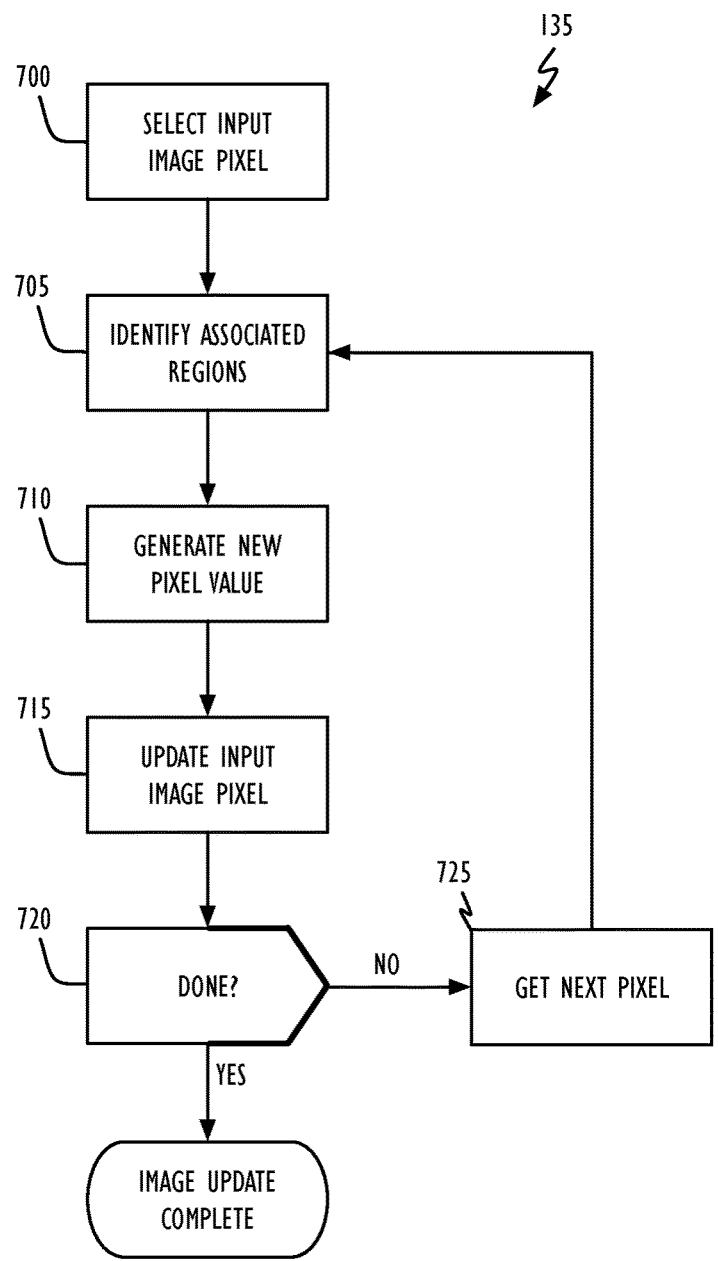
FIG. 7 shows, in flowchart form, an input image pixel manipulation operation in accordance with one embodiment.

Referring now to FIG. 7, input image pixel manipulation operation 135 in accordance with one or more embodiments selects a first pixel from an input image (block 700). The pixel selected here is from the input image, not the single-channel luminance image 215. Next, a number of regions associated with the selected pixel may be identified (block 705). In one embodiment, only that region from which the input image pixel was selected may be identified. In other embodiments, in addition to identifying that region from which the input image pixel was selected, each immediately adjacent region may also be identified. That is, for each pixel at a given position (x, y) there are 4 cells whose center points (the 4 closest ones) that enclose an area in which this pixel is placed. This set of 4 center points is well defined for each pixel. It is noted that when discussing "regions," it is equally correct to discuss the input image (e.g., one of the temporal sequence of images 105 or input image 200) or the corresponding single channel luminance image (e.g., image 215). The two images are the same size and contain the same number of pixel elements (albeit different pixel elements). The input image pixel and the LTMs or LUT contents corresponding to the LTMs of the identified regions, may then be used to generate a new pixel value (block 710) which may be used to update the input image's selected pixel value (block 715). If there are more pixels to evaluate or process in the input image (the "NO" prong of block 720), the next input image pixel is selected (block 725), where after operation 135 continues at block 705. If all of the input image's pixels have been evaluated (the "YES" prong of block 720), the current input image pixel has been updated and is ready for display.

Figure 8A:
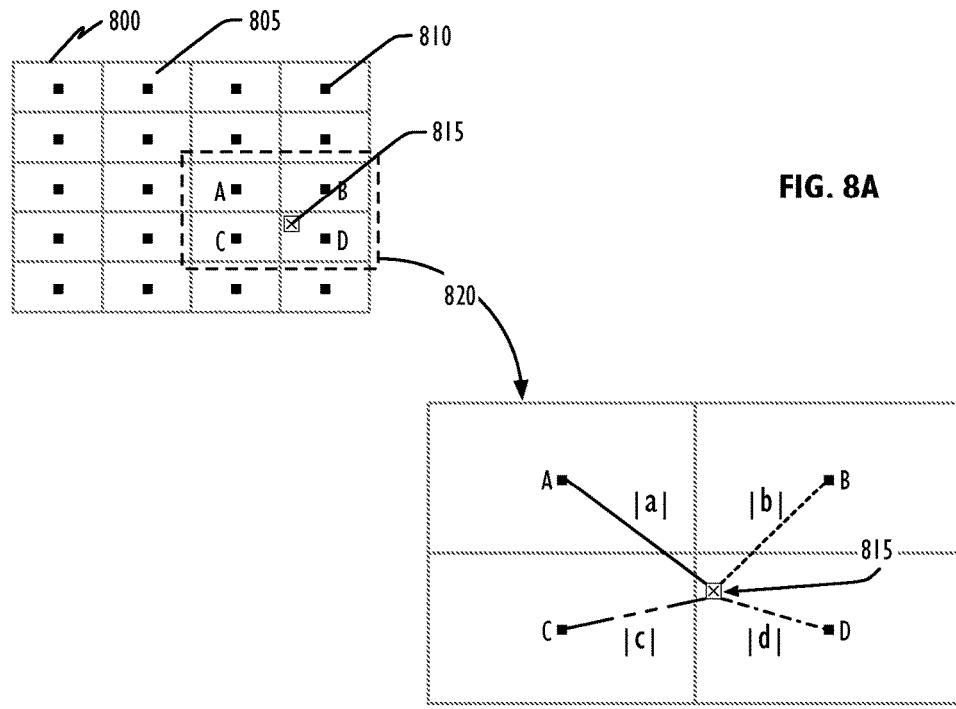
FIGS. 8A-8B illustrate a local tone map interpolation operation in accordance with one embodiment.

Looking at FIGS. 3 and 4, it may be recognized that because each region encompasses a large number of pixels (typically on the order of 1,000s), each region's LTM may be thought of as implementing a single value (represented as a LUT). For purposes of this disclosure, the "location" of each region's LTM may be taken as the region's center-point. From this, a distance (e.g., a Hamming or L1 distance) may be measured between any arbitrary location (such as the location corresponding to an input pixel) and a region's LTM. Referring now to FIG. 8A, let 800 represent the input image (or single channel luminance image), each small rectangular area a region as described above (one of which is identified as 805), each solid black square inside a region the location of the region's LTM (one of which is identified as 810), and 810 the location corresponding to the input image's selected pixel. Then, in one embodiment, area 820 may represent the input pixel's associated regions in accordance with block 705. In this particular embodiment, an input pixel's associated regions may include four (4) enclosing regions. In other embodiments, an input pixel's associated regions may include fewer (e.g., the region in which the input pixel is a member and a next closest region) or more regions (e.g., the region in which the input pixel is a member and all immediately adjacent regions).

Figure 8B:
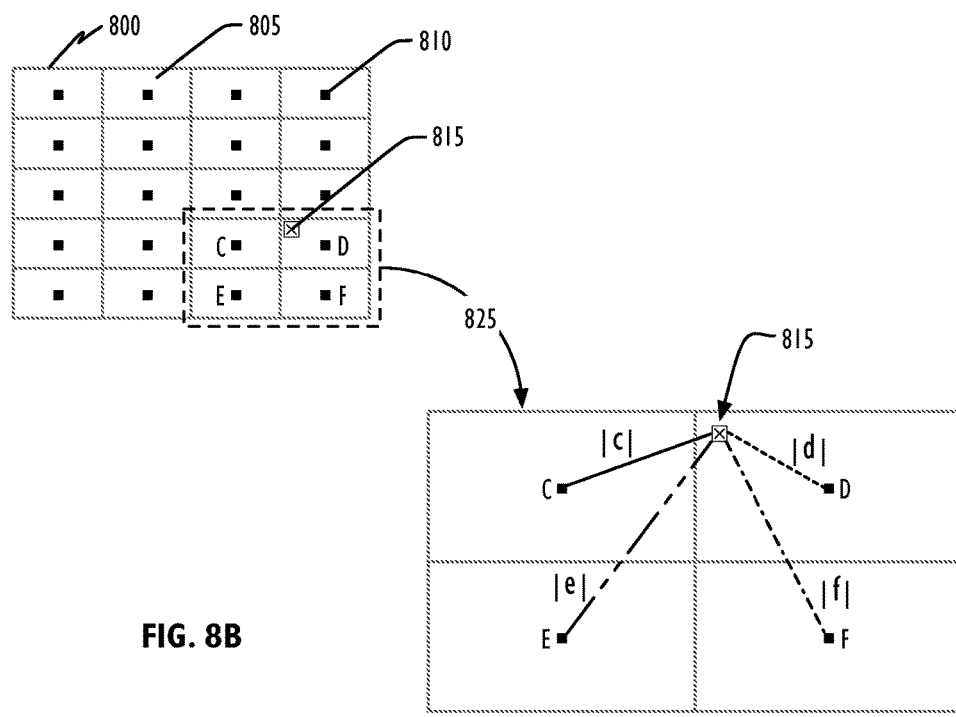

Also shown in FIG. 8A is an expanded view of area 820. There 4 distances are identified: |a| representing the distance from the center of region A to the selected input pixel; |b| representing the distance from the center of region B to the selected input pixel; |d| representing the distance from the center of region C to the selected input pixel; and |d| representing the distance from the center of region D to the selected input pixel. In accordance with some embodiments, a new value for the selected input image pixel may be a weighted combination of the selected LTM. One such weighted combination may be based on the distances from the selected input image pixel to each of the associated regions' LTMs. By way of example:

$$\text{new value} = (A \times |a|) + (B \times |b|) + (C \times |c|) + (D \times |d|), \quad \text{EQ. 3}$$

where A, B, C and D represent the LTM value of each of the four associated regions, |a| represents the distance from the center of region A to the selected input image pixel, |b| represents the distance from the center of region B to the selected input image pixel, |c| represents the distance from the center of region C to the selected input image pixel, and |d| represents the distance from the center of region D to the selected input image pixel. FIG. 8B shows an alternative enclosing area 825 for the selected input image pixel. One of ordinary skill in the art will recognize in light of this disclosure that the selected region may be other than rectangular, and include fewer or more regions than those illustrated here.

Figure 9:
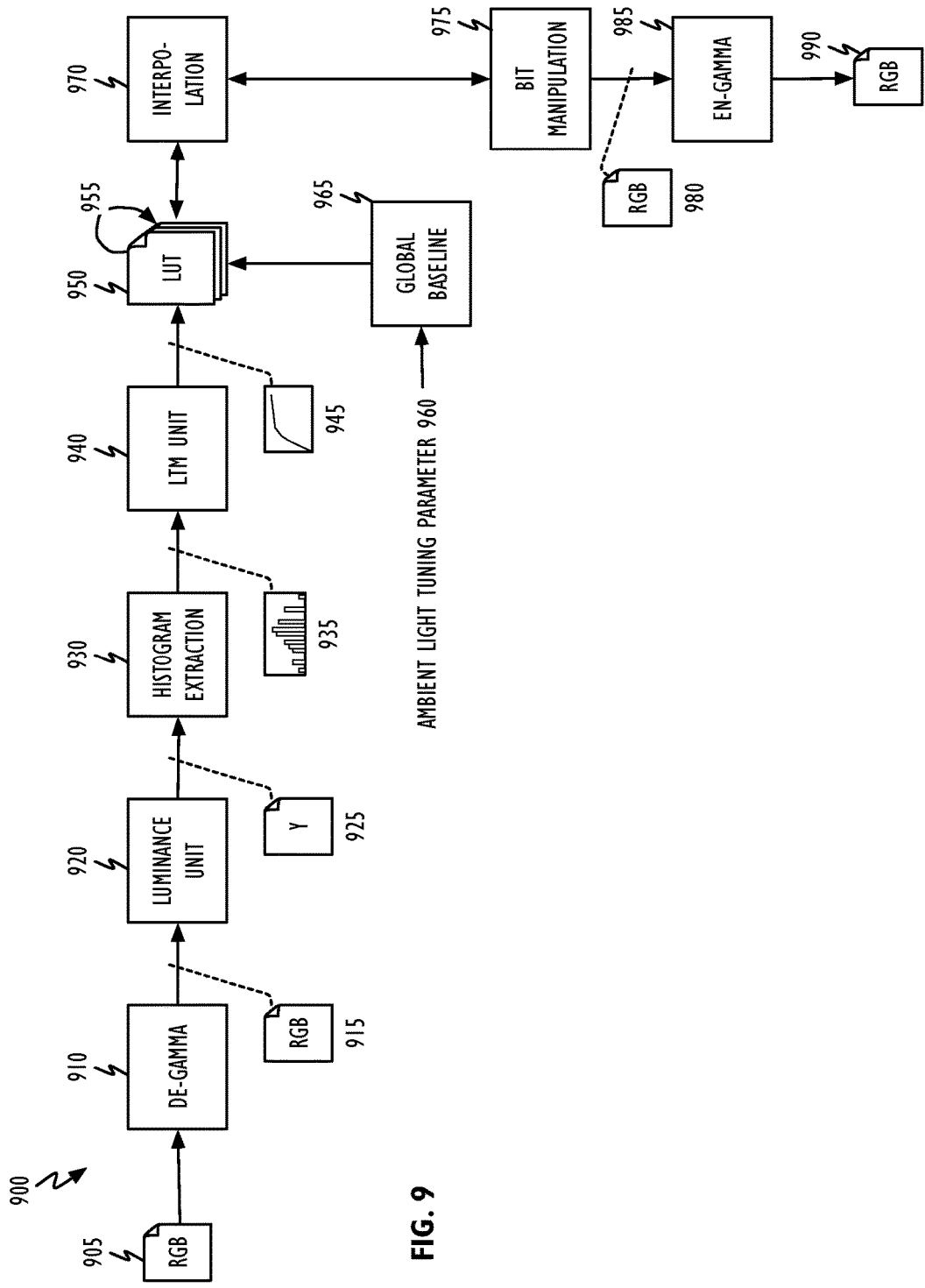
FIG. 9 shows, in block diagram form, a system architecture in accordance with one embodiment.

Referring to FIG. 9, system 900 illustrates one architecture for implementing display operation 100. As discussed above, each image (e.g., color image 905) in a temporal sequence of images/frames may be routed to de-gamma unit 910 (which generates linear space color image 915) and then to luminance unit 920 (which generates single-channel luminance image 925). In one embodiment, luminance unit 920 may implement a max(R, G, B) function. Each luminance image may then be partitioned into a specified number of regions and histograms extracted for each region by unit 930. Histogram unit 930 may also, in some embodiments, normalize and filter the extracted histograms 935. An image's normalized histograms 935 may be used by LTM unit 940 to find initial local tone mapping curves 945 for each region as described (see FIGS. 4-6). An image's collection of LTMs may be represented by LUTs 950; one LUT for each region's LTM. For example, if each image is partitioned into 32 regions, there will be 32 LUTs for each image. Once generated, each LUT may be filtered 955 by, for example, a 3×3 Gaussian filter. Input representing an ambient light tuning parameter 960—based on the measured level of ambient light—may be input to global baseline unit 965 to facilitate the creation of global minimum and maximum LTM slope values $s_g^{min}$ and $s_g^{max}$. In one embodiment, $s_g^{min}$ and $s_g^{max}$ may be derived by a non-linear mapping from an ambient light sensor's input. In one or more other embodiments, input 960 may be provided by an ambient light sensor. In still other embodiments, input 960 may be determined based on additional analysis of input image 905, 915 or 925. In one embodiment, interpolation unit 970 performs the analysis described above with respect to FIG. 8 while bit manipulation unit 975 generates linear color image 980 by substituting the input image pixel's new interpolated value for the image's corresponding original pixel. In one specific embodiment, the ratio of the incoming single-channel luminance to the LUT value may be determined and thereafter applied to all three color channels (R, G and B). Linear color image 980 may be gamma encoded 985 to generate color output image 990 for display. In one or more embodiments, there is a one-to-one relation between the sequence of output images (e.g., output image 990) and the sequence of input images (e.g., input image 905). In other embodiments however, there are more images in the input sequence than there are in output sequence.

Figure 10:
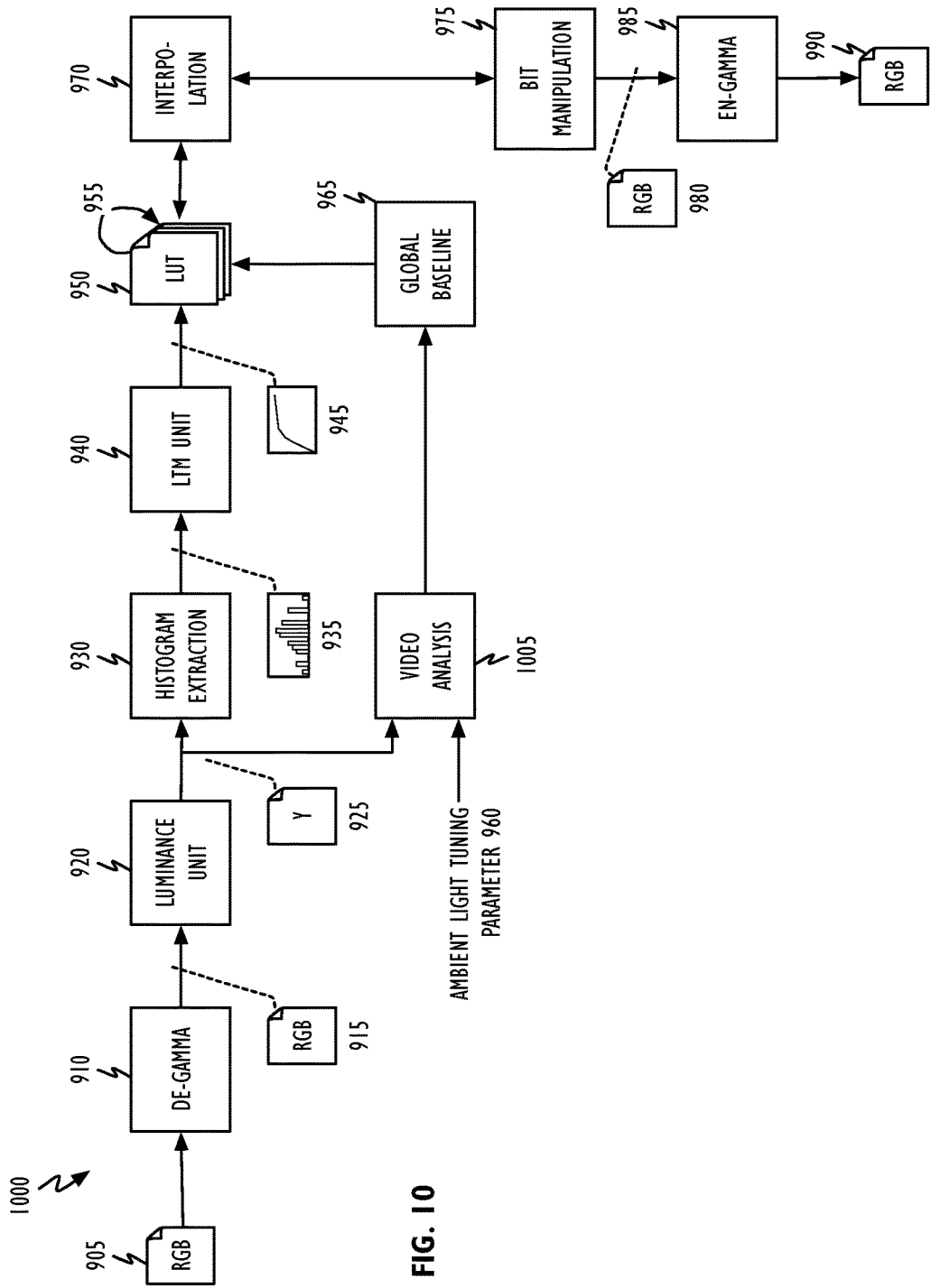
FIG. 10 shows, in block diagram form, a system architecture in accordance with another embodiment.

Referring to FIG. 10, system 1000 illustrates another architecture for implementing display operation 100. System 1000 is similar to system 900 except that it also includes video analysis unit 1005. One function of video analysis unit 1005 is to detect fade-in and fade-out events. In one embodiment this may be accomplished by tracking the average global luminance change (first derivative of the average pixel level over time). Based on the change in global luminance, the global luminance and ambient light tuning parameter 960 may be reduced to avoid flicker between successive images in output image sequence. For example, for fade-in this limits the range between $s_g^{min}$ and $s_g^{max}$ (having less contrast) to avoid flicker due to a one frame delay.

Figure 11:
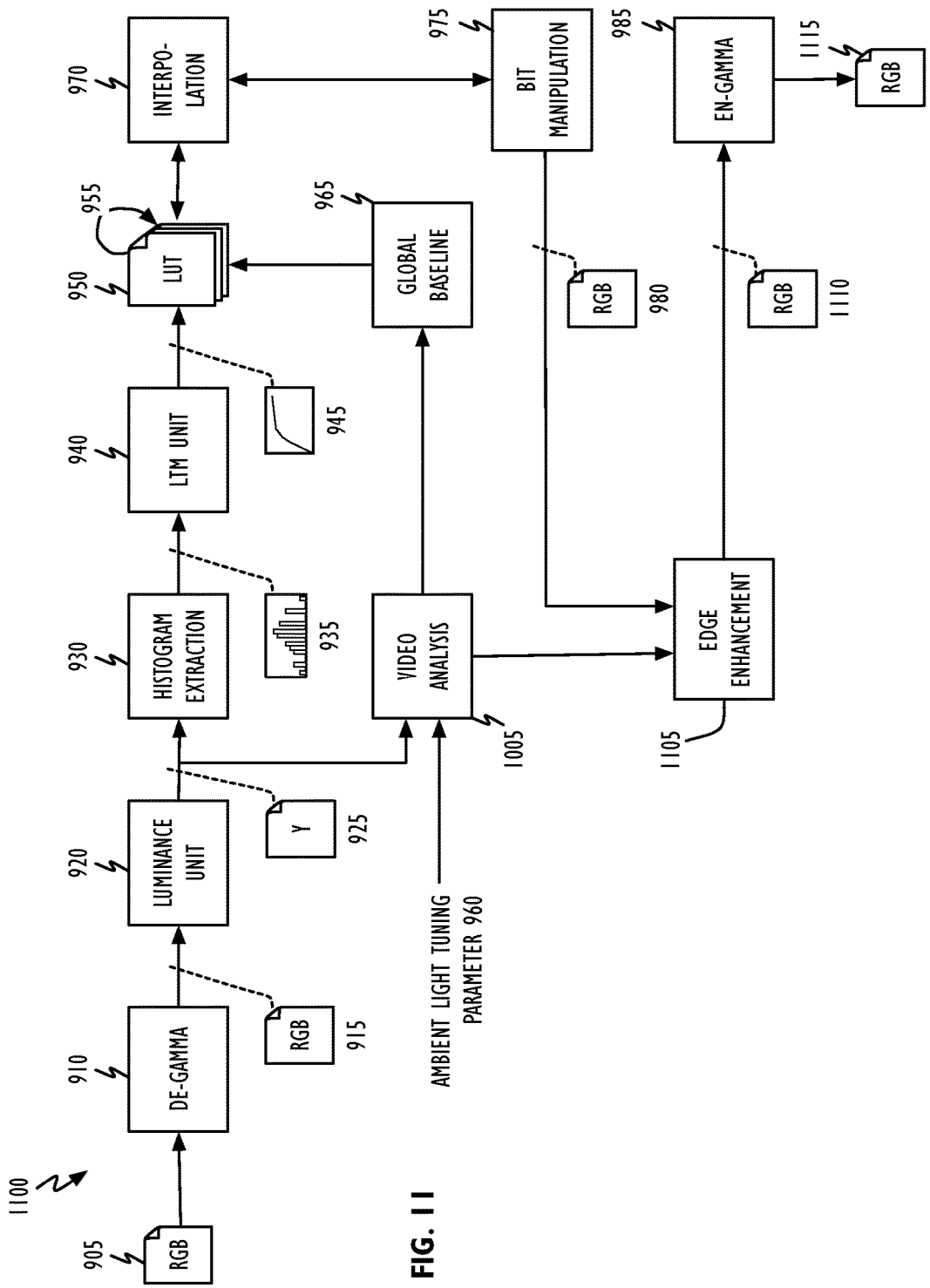
FIG. 11 shows, in block diagram form, a system architecture in accordance with yet another embodiment.

Referring to FIG. 11, system 1100 illustrates yet another architecture for implementing display operation 100. System 1100 is similar to system 1000 except that it also includes edge enhancement unit 1105. One function of edge enhancement unit 1105 is to improve the display (presentation) of bright and mid-gray areas. Such areas can look washed out due to dynamic range limitations. In one embodiment, edge enhancement techniques are not applied to dark areas in the image. As shown in this particular implementation, output from video analysis unit 1005 may be used to identify dark regions within linear color image 980. After applying edge enhancement to non-dark regions to linear color image 980, the updated linear color image 1110 may be routed to gamma encoder 985 to generate non-linear color output image 1115; that is ready for display in accordance with this disclosure.

Figure 12:
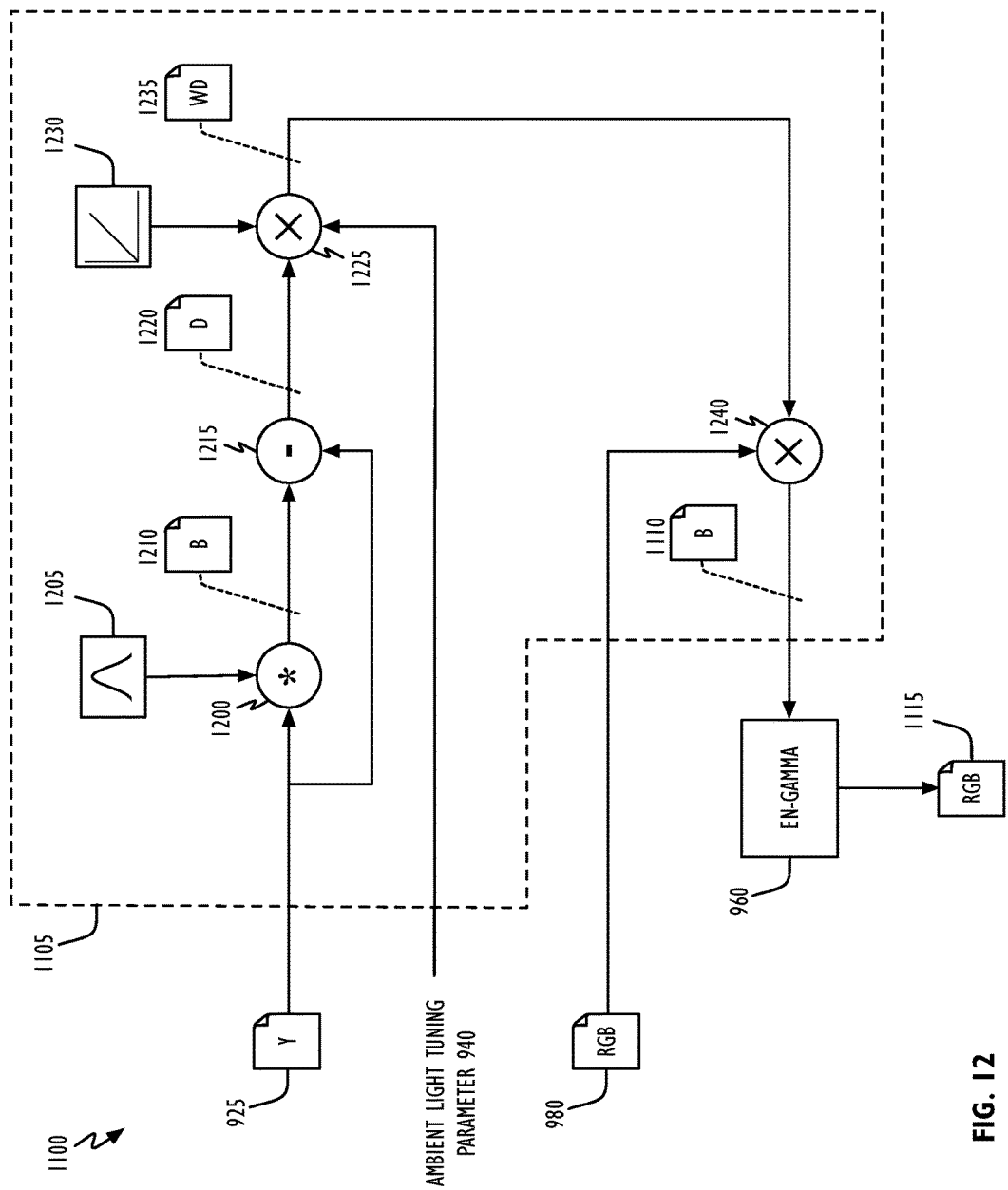
FIG. 12 shows, in block diagram form, a system architecture in accordance with still another embodiment.

Referring to FIG. 12, system 1100 is shown with details for one implementation of edge enhancement unit 1105 illustrated. To begin, single-channel luminance image 925 may be convolved (via operator 1200) with blurring kernel 1205 to yield blurred image 1210. In one embodiment, blurring kernel 1205 may be a small—e.g., 5×5—Gaussian kernel. It may be recognized that the larger the blurring kernel, the more edges will be detected, resulting in more pixels being "touched." Difference image 1220 may then be multiplied (via operator 1225), luminance weight 1230 and ambient light tuning parameter 940 to generate weighted difference image 1235. In one embodiment, luminance weight 1230 may be modeled as a binary value: having a positive value (e.g., 1) for non-bright pixels and zero value for bright pixels, where the distinction between bright and non-bright is an implementation decision. Weighted difference image 1235 may next be multiplied (via operator 1240) by linear color image 980 (output from bit manipulation unit 975) to generate linear output color image 1110 which, when gamma encoded by unit 960, yields output color image 1115.

Figure 13:
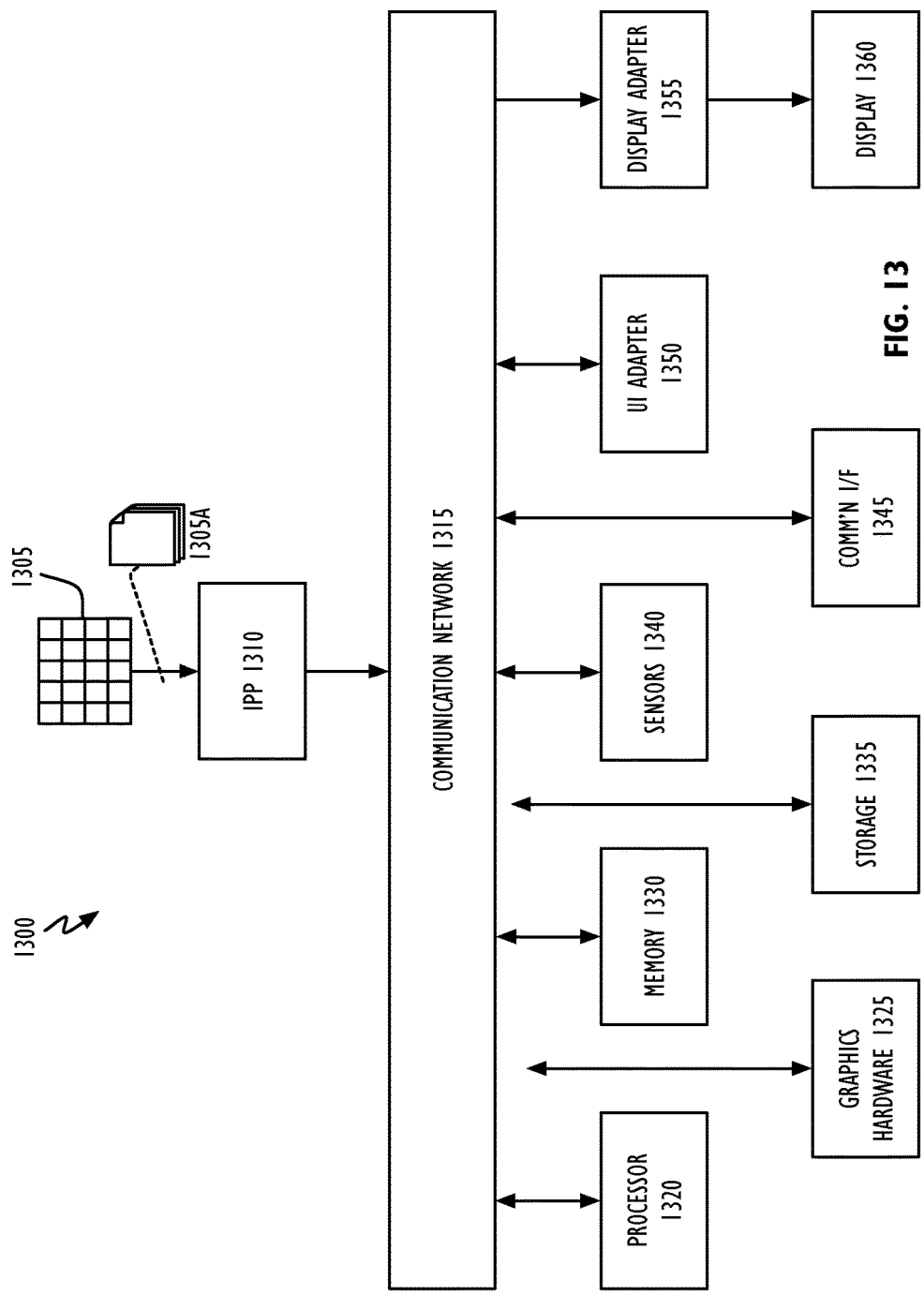
FIG. 13 shows, in block diagram form, a computer system in accordance with one embodiment.

One computer system architecture suitable for implementing display operation 100 is illustrated in FIG. 13. By way of example, computer system 1300 could be a desktop, laptop, notebook or tablet computer system. In other embodiments, computer system 1300 could be a personal computing device such as a mobile telephone or personal entertainment device. Computer system 1300 can be housed in single physical enclosure or spatially distributed between two or more different locations. Illustrative computer system 1300 may include one or more image sensors 1305, image processing pipeline (IPP) 1310, communication network 1315, one or more processors 1320, graphics hardware 1325, memory 1330, storage 1335, device sensors 1340, communication interface 1345, user interface adapter 1350, display adapter 1355, and display 1360.

Image sensor 1305 may provide color images (video or still) and use, for example, complementary metal-oxide semiconductor (CMOS) or charged-coupled device (CCD) technology. In practice, image sensor 1305 may be used to obtain a temporal sequence of images (1305A) which is passed to image processing pipeline 1310. Image processing pipeline 1310 may, in turn, include a de-gamma unit, a local histogram unit, a local tone mapping unit, a pixel manipulation unit, a video analysis unit, an edge enhancement unit, and a gamma encoder. Each unit within pipeline 1310 may perform the operations described in the manner discussed above with respect to FIGS. 1, 4, 7 and 9-12. Image processing pipeline 1310 may be implemented as specialized hardware, specialized software, or a combination of both. Image processing pipeline 1310 may perform one or more operations on raw images (also known as raw image files) received from image sensor 1305 and can also provide processed image data to processor 1320, graphics hardware 1325, memory 1330, storage 1335 communication interface 1345, user interface adapter 1350 and display 1360 (via display adapter 1355) through communication network 1315.

Communication network 1315 may be comprised of one or more continuous (as shown) or discontinuous communication links and be formed as a bus network, a communication network, or a fabric comprised of one or more switching devices. Communication network 1315 may be, at least partially, embodied in a network router or hub, a wireless access point (AP) or repeater, a set-top box, or a combination thereof. Processor module or circuit 1320 may include one or more processing units each of which may include at least one central processing unit (CPU) and/or zero or more graphics processing units (GPUs); each of which in turn may include one or more processing cores. Each processing unit may be based on reduced instruction-set computer (RISC) or complex instruction-set computer (CISC) architectures or any other suitable architecture. Processor module 1320 may be a system-on-chip, an encapsulated collection of integrated circuits (ICs), or a collection of ICs affixed to one or more substrates. Graphics hardware module or circuit 1325 may be special purpose computational hardware for processing graphics and/or assisting processor 1320 perform computational tasks. In one embodiment, graphics hardware 1325 may include one or more GPUs, and/or one or more programmable GPUs and each such unit may include one or more processing cores. Memory 1330 may include one or more different types of media (typically solid-state, but not necessarily so) used by processor 1320, graphics hardware 1325, device sensors 1340, communication interface 1345, user interface adapter 1350 and display adapter 1355. For example, memory 1330 may include memory cache, read-only memory (ROM), and/or random access memory (RAM). Storage 1335 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 1330 and storage 1335 may be used to retain media (e.g., audio, image and video files), preference information, device profile information, computer program instructions or code organized into one or more modules and written in any desired computer programming languages, and any other suitable data. When executed by processor(s) 1320 and/or graphics hardware 1325 and/or functional elements within image processing pipeline 1310 such computer program code may implement one or more of the methods described herein. Device sensors 1340 may include, but need not be limited to, an optical activity sensor, an optical sensor array, an accelerometer, a sound sensor, a barometric sensor, a proximity sensor, an ambient light sensor, a vibration sensor, a gyroscopic sensor, a compass, a barometer, a magnetometer, a thermistor sensor, an electrostatic sensor, a temperature sensor, a heat sensor, a thermometer, a light sensor, a differential light sensor, an opacity sensor, a scattering light sensor, a diffractional sensor, a refraction sensor, a reflection sensor, a polarization sensor, a phase sensor, a florescence sensor, a phosphorescence sensor, a pixel array, a micro pixel array, a rotation sensor, a velocity sensor, an inclinometer, a pyranometer and a momentum sensor. Communication interface 1345 may be used to connect computer system 1300 to one or more networks. Illustrative networks include, but are not limited to, a local network such as a Universal Serial Bus (USB) network, an organization's local area network, and a wide area network such as the Internet. Communication interface 1345 may use any suitable technology (e.g., wired or wireless) and protocol (e.g., Transmission Control Protocol (TCP), Internet Protocol (IP), User Datagram Protocol (UDP), Internet Control Message Protocol (ICMP), Hypertext Transfer Protocol (HTTP), Post Office Protocol (POP), File Transfer Protocol (FTP), and Internet Message Access Protocol (IMAP)). User interface adapter 1350 may be used to connect computer system 1300 with microphone(s), speaker(s), pointer device(s), a keyboard or other input device such as a touch-sensitive display element (e.g., display 1360). Display adapter 1355 may be used to connect one or more display units 1360 which may also provide touch input capability.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). For example, a system in accordance with this disclosure may include, or not, video analysis (via unit 1005) or edge detection (via unit 1105). Further, FIGS. 1, 4 and 7 show flowcharts illustrating different aspects of the disclosed embodiments. In one or more embodiments, one or more of the disclosed steps may be omitted, repeated, and/or performed in a different order than that described herein. Accordingly, the specific arrangement of steps or actions shown in any of FIGS. 1, 4 and 7 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:
1. A method, comprising:
   capturing a first image in an environment having an ambient light level;
   determining the ambient light level from a sensor;
   partitioning the first image into a first plurality of regions;

determining a histogram for each of the first plurality of regions;

determining a local tone mapping curve for each of the first plurality of regions, each local tone mapping curve based on the corresponding histogram and the determined ambient light level;

selecting a first pixel from a first region of the first image;

identifying a second plurality of regions, each of the second plurality of regions corresponding to a region that coincides with, or is immediately adjacent to, the first region;

determining a second pixel value based on a value of the first pixel and a second plurality of local tone mapping curves, wherein each of the second plurality of local tone mapping curves corresponds to one of the second plurality of regions; and displaying the first image after replacing the first pixel's value with the second pixel value.

2. The method of claim 1, wherein receiving a first image further comprises:

applying a de-gamma operation to the first image to generate a second image, each pixel in the second image having a third plurality of values; and generating a third image based on the second image, each pixel of the third image having a single value.

3. The method of claim 2, wherein each of the first plurality of regions are non-overlapping.

4. The method of claim 3, wherein determining a histogram for each of the first plurality of regions comprises:

selecting a region of the third image;

determining a value for each bin of a histogram for the selected region of the third image based on pixel values from the selected region in the third image and further based on pixel values from regions in the third image that are immediately adjacent to the selected region; and repeating the selecting a region and the determining a value for each bin actions for each region of the third image.

5. The method of claim 4, wherein determining a local tone mapping curve for each of the first plurality of regions comprises, for each region's corresponding histogram:

determining a slope for each bin of a histogram, wherein each bin's slope is based on the histogram bin's value, a contrast value, a specified bin minimum slope value, or a specified bin maximum slope value; and filtering, after determining a slope for each of the histogram's bins, the histogram, so as to smooth the resulting local tone mapping curve.

6. The method of claim 5, wherein determining a local tone mapping curve is further based on a video analysis of the third image and at least one later captured image from a temporal sequence of images of which the first image is one image.

7. The method of claim 2, wherein determining a second pixel value is further based an edge-enhancement operation of the third image.

8. The method of claim 7, wherein displaying the first image comprises:

applying, after replacing the first pixel's value in the third image with the second pixel value, a gamma operation to the third image to generate a fourth image, each pixel in the fourth image having the third plurality of values; and displaying the fourth image.

9. A non-transitory program storage device comprising instructions stored thereon to cause one or more processors to:

capture a first image in an environment having an ambient light level;

determine the ambient light level from a sensor;

partition the first image into a first plurality of regions;

determine a histogram for each of the first plurality of regions;

determine a local tone mapping curve for each of the first plurality of regions, each local tone mapping curve based on the corresponding histogram and the determined ambient light level;

select a first pixel from a first region of the first image;

identify a second plurality of regions, each of the second plurality of regions corresponding to a region that coincides with, or is immediately adjacent to, the first region;

determine a second pixel value based on a value of the first pixel and a second plurality of local tone mapping curves, wherein each of the second plurality of local tone mapping curves corresponds to one of the second plurality of regions; and display the first image after replacing the first pixel's value with the second pixel value.

10. The non-transitory program storage device of claim 9, wherein the instructions to receive a first image further comprise instructions to:

apply a de-gamma operation to the first image to generate a second image, each pixel in the second image having a third plurality of values; and generate a third image based on the second image, each pixel of the third image having a single value.

11. The non-transitory program storage device of claim 10, wherein each of the first plurality of regions are non-overlapping.

12. The non-transitory program storage device of claim 11, wherein the instructions to determine a histogram for each of the first plurality of regions comprise instructions to:

select a region of the third image;

determine a value for each bin of a histogram for the selected region of the third image based on pixel values from the selected region in the third image and further based on pixel values from regions in the third image that are immediately adjacent to the selected region; and repeat the selecting a region and the determining a value for each bin instructions for each region of the third image.

13. The non-transitory program storage device of claim 12, wherein the instructions to determine a local tone mapping curve for each of the first plurality of regions comprise instructions to, for each region's corresponding histogram:

determine a slope for each bin of a histogram, wherein each bin's slope is based on the histogram bin's value, a contrast value, or a specified bin minimum slope value, or a specified bin maximum slope value; and filter, after a slope for each of the histogram's bins has been determined, the histogram so as to smooth the resulting local tone mapping curve.

14. The non-transitory program storage device of claim 13, wherein the instructions to determine a local tone mapping curve is further based on instructions to perform a video analysis of the third image and at least one later captured image from a temporal sequence of images of which the first image is one image.

15. The non-transitory program storage device of claim 10, wherein the instructions to determine a second pixel value is further based an edge-enhancement operation of the third image.

16. The non-transitory program storage device of claim 15, wherein the instructions to display the first image comprise instructions to:
apply, after first pixel's value in the third image has been replaced with the second pixel value, a gamma operation to the third image to generate a fourth image, each pixel in the fourth image having the third plurality of values; and
display the fourth image.

17. A device, comprising:
an image capture element;
an ambient light sensor;
a display element;
memory; and
one or more processors operatively coupled to the image capture element, the ambient light sensor, the display element and the memory, the one or more processors configured to execute instructions stored in the memory to cause the device to—
capture, using the image capture element, a first image of a scene;
measure, using the ambient light sensor, an ambient light level coincident with capture of the first image;
partition the first image into a first plurality of regions;
determine a histogram for each of the first plurality of regions;
determine a local tone mapping curve for each of the first plurality of regions, each local tone mapping curve based on the corresponding histogram and the determined ambient light level;
select a first pixel from a first region of the first image;
identify a second plurality of regions, each of the second plurality of regions corresponding to a region that coincides with, or is immediately adjacent to, the first region;
determine a second pixel value based on a value of the first pixel and a second plurality of local tone mapping curves, wherein each of the second plurality of local tone mapping curves corresponds to one of the second plurality of regions; and
display, on the display element, the first image after replacing the first pixel's value with the second pixel value.

18. The device of claim 17, wherein the instructions to receive a first image further comprise instructions to:
apply a de-gamma operation to the first image to generate a second image, each pixel in the second image having a third plurality of values; and
generate a third image based on the second image, each pixel of the third image having a single value.

19. The device of claim 18, wherein each of the first plurality of regions are non-overlapping.

20. The device of claim 19, wherein the instructions to determine a histogram for each of the first plurality of regions comprise instructions to:
select a region of the third image;
determine a value for each bin of a histogram for the selected region of the third image based on pixel values from the selected region in the third image and further based on pixel values from regions in the third image that are immediately adjacent to the selected region; and
repeat the selecting a region and the determining a value for each bin instructions for each region of the third image.

21. The device of claim 20, wherein the instructions to determine a local tone mapping curve for each of the first plurality of regions comprise instructions to, for each region's corresponding histogram:
determine a slope for each bin of a histogram, wherein each bin's slope is based on the histogram bin's value, a contrast value, a specified bin minimum slope value, or a specified bin maximum slope value; and
filter, after a slope for each of the histogram's bins has been determined, the histogram so as to smooth the resulting local tone mapping curve.

22. The device of claim 21, wherein the instructions to determine a local tone mapping curve is further based on instructions to perform a video analysis of the third image and at least one later captured image from a temporal sequence of images of which the first image is one image.

23. The device of claim 18, wherein the instructions to determine a second pixel value is further based an edge-enhancement operation of the third image.

24. The device of claim 23, wherein the instructions to display the first image comprise instructions to:
apply, after first pixel's value in the third image has been replaced with the second pixel value, a gamma operation to the third image to generate a fourth image, each pixel in the fourth image having the third plurality of values; and
display the fourth image.

* * * * *